Dec. 10, 1968
R. O. MALMSTEN
3,415,580
SHAFT WITH DEFORMABLE END PORTION
Filed July 7, 1966
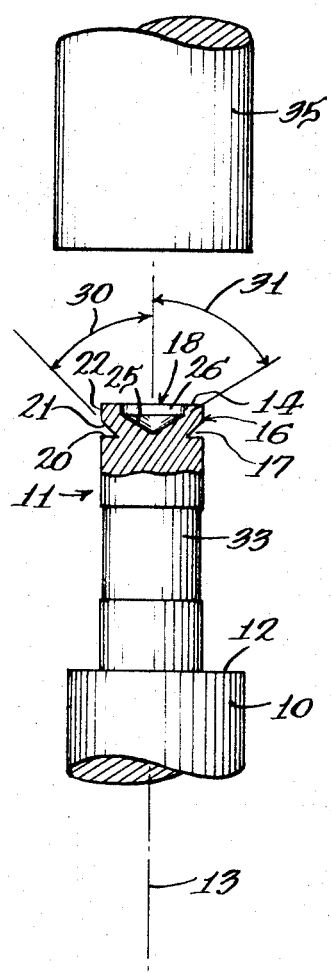
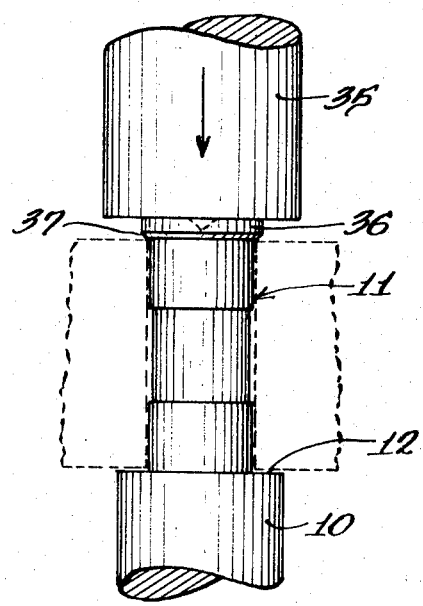
Inventor:
Robert O. Malmsten
By Hofgren, Wegner,
Allen, Stellman & McCord
Attys

United States Patent Office 3,415,580
Patented Dec. 10, 1968

3,415,580
SHAFT WITH DEFORMABLE END PORTION
Robert O. Malmsten, Barrington, Ill., assignor to
Skill-Di, Inc., a corporation of Illinois
Filed July 7, 1966, Ser. No. 563,549
2 Claims. (Cl. 308—15)

ABSTRACT OF THE DISCLOSURE

A shaft which has an end with an axially deformable riveting portion defined by a peripheral groove spaced from the end of the shaft. The peripheral groove is bounded by a radial surface which faces the end of the shaft and a truncated conical surface on the deformable riveting portion. The radial surface defines the axial extent of the deformation. A recess is formed in the end face of the shaft and the peripheral groove defines with the recess a cup-shaped end portion which has a thinner wall thickness at the periphery of the shaft than at the center.

---

It is known to deform the end of a shaft by striking it axially. This causes a displacement of the shaft material to form an outwardly extending flange at the shaft end. It may, for example, be used for mounting the shaft to a plate or to define a retaining surface for a wheel or gear. It is difficult, however, to control the precise axial location of the outwardly extending flange. For example, in mounting a gear on a shaft, if the shaft end is struck with too much force and deformed to an excessive extent, the gear will be locked securely and unable to turn. On the other hand, if the shaft is not struck hard enough, the axial deformation is less than that desired and the gear will have axial play.

It is a principal object of this invention to provide a novel shaft construction with a deformable end portion in which the axial extent of the deformation is accurately controlled.

More specifically, one feature of the invention is the provision of a shaft having an end with a cup-shaped axially deformable riveting portion defined by a peripheral groove spaced from the end and a recess in the end face. The application of axial force to the deformable portion, as by striking with a tool, causes the cup to deform in an axial direction to an extent limited by the peripheral groove. Another feature is that the shaft has a bearing surface defined by a shoulder spaced from and facing the end, and by the deformed end portion.

Yet another feature is that the groove in the shaft is bounded by a radially extending surface and a truncated conical surface. Still a further feature is that the angle between the axis of the shaft and the conical surface of the groove is less than the angle between the axis of the shaft and the inner surface of the recess. This results in the cup having an inner end wall which is thinner at the periphery of the shaft than at the center. This relationship aids in the control of deformation of the end portion.

And anoother feature of the invention is the provision of a shaft having an annular retaining portion at the end thereof formed by axial deformation of a cup-shaped shaft portion defined by a groove around the shaft and a recess in the end face thereof.

Further features and advantages of the invention will readily be apparent from the following specification and from the drawings, in which:

FIGURE 1 is a fragmentary elevation of a shaft embodying the invention with a portion in section and showing a deforming tool spaced from the end of the shaft; and FIGURE 2 is a fragmentary elevation of the shaft end of FIGURE 1 with the deforming tool in contact therewith, illustrating the deforming operation and the configuration of the retaining surface.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

In general throughout the specification and claims, the invention will be described as applied to the end of a shaft or rod. It is to be understood that this is intended to include any elongated rod-like projection as a boss or stud or the like where an outwardly extending flange formed at the end might be desired. The shaft may be of any suitable material which may be worked by striking. One example is soft cold-rolled steel.

Turning now to the drawings, a shaft 10 has an end portion 11 forming a bearing surface on which a wheel or gear or the like may be mounted. The inner boundary of the bearing surface is established by a shoulder 12 lying in a radial plane at right angles to the axis 13 of the shaft and spaced from the end face 14 of the shaft. The end of the shaft has formed therein a cup-shaped axially deformable riveting portion 16 which is defined by an annular groove 17, spaced from the end face 14 of the shaft, and an axially extending recess 18 formed in the end face of the shaft.

Groove 17 is generally triangular in cross-section and defined by a surface 20 which extends radially outwardly at right angles to the shaft axis 13, and a truncated conical surface 21 which faces generally away from the end of the shaft. Surface 21 intersects the outer surface 22 of the bearing portion of the shaft end at a point spaced from the end of the shaft. Recess 18 has a conical inner end wall 25 and a cylindrical wall 26 which extends to the end face 14 of the shaft.

The angle 30 formed between conical groove surface 21 and shaft axis 13 is preferably slightly less than the angle 31 formed between recess surface 25 and axis 13. In the specific embodiment of the invention illustrated in the drawing, angle 30 is of the order of 45° and angle 31 is of the order of 60°. The cup-shaped end portion 16 has a generally uniform wall thickness, but because of the difference in pitch of the surfaces 21 and 25 is slightly thinner at the periphery of the shaft than at the center. This facilitates axial deformation and outward expansion of the material.

A lubricant groove 33 is formed in the outer surface of the shaft between shoulder 12 and the end. This groove may be filled with a suitable lubricant before a wheel, gear or the like is placed on the shaft.

The end portion of the shaft is deformed by a suitable tool, as a punch 35, moved axially toward the end face 14 of the shaft, to strike it squarely on the end as shown in FIGURE 2. The wall of the cup-shaped end portion 16 is moved axially toward the body of the shaft closing triangular groove 17. The cup walls are also forced outwardly to form flange 36. The inner face 37 of the flange appears to be chamfered, an appearance which results from the incomplete deformation of conical surface 21.

The axial extent of the deformation and thus the space between shoulder 12 and flange 36 is established by the location of the outwardly facing surface 20 of groove 17. This permits accurate establishment of the axial play for a wheel, gear or the like shown in broken lines at 38, mounted on the shaft.

I claim:
1. A shaft having an end with an axially deformable riveting portion at said end, defined by a peripheral groove spaced from the end, said groove being bounded by a radial surface integral with the shaft which faces the end of said shaft and a truncated conical surface on said deformable riveting portion, whereby said truncated conical surface abuts against said radial surface on deformation of said riveting portion so that said radial surface defines the axial extent of the deformation.

2. The shaft of claim 1 including a recess in the end face of the shaft, the recess having an inner surface generally parallel with said conical groove surface, and wherein the angle between the axis of the shaft and the conical groove surface is less than the angle between the axis and the inner surface of said recess so that the wall of said deformable riveting portion is thinner at the periphery of said shaft than at the center.

References Cited
UNITED STATES PATENTS

| | | | |
|---|---|---|---|
| 1,953,197 | 4/1934 | Smith | 92—169 |
| 937,936 | 10/1909 | Hassenplug | 308—97 |
| 2,346,747 | 4/1944 | Gries | 29—512 X |
| 2,495,516 | 1/1950 | Foster | 308—5 X |
| 2,577,654 | 12/1951 | Gates | 29—512 X |
| 3,058,454 | 10/1962 | Goncalves | 308—5 X |
| 3,262,338 | 7/1966 | Mahall | 29—512 X |

MARTIN P. SCHWADRON, *Primary Examiner.*

G. N. BAUM, *Assistant Examiner.*

U.S. Cl. X. R.

308—18; 29—512